(12) United States Patent
Osaki (10) Patent No.: US 11,300,177 B2
(45) Date of Patent: Apr. 12, 2022

(54) TOOTHED BELT AND MANUFACTURING METHOD THEREFOR

(71) Applicant: Mitsuboshi Belting Ltd., Kobe (JP)

(72) Inventor: Susumu Osaki, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 783 days.

(21) Appl. No.: 16/307,177

(22) PCT Filed: Jun. 5, 2017

(86) PCT No.: PCT/JP2017/020876
§ 371 (c)(1),
(2) Date: Dec. 5, 2018

(87) PCT Pub. No.: WO2017/213103
PCT Pub. Date: Dec. 14, 2017

(65) Prior Publication Data
US 2019/0128371 A1    May 2, 2019

(30) Foreign Application Priority Data

Jun. 6, 2016  (JP) .............................. JP2016-112473
May 31, 2017  (JP) .............................. JP2017-107941

(51) Int. Cl.
*F16G 1/16* (2006.01)
*F16G 1/28* (2006.01)
(Continued)

(52) U.S. Cl.
CPC ................ *F16G 1/16* (2013.01); *B29C 39/10* (2013.01); *B29C 70/30* (2013.01); *F16G 1/28* (2013.01);
(Continued)

(58) Field of Classification Search
CPC ..... F16G 1/28; F16G 1/10; F16G 1/04; F16G 1/08; B29D 29/08
(Continued)

(56) References Cited

U.S. PATENT DOCUMENTS 4,895,555 A    1/1990   Watanabe et al.
4,963,308 A    10/1990  Watanabe et al.
(Continued)

FOREIGN PATENT DOCUMENTS

CN    102844172 A    12/2012
CN    103804623 A    5/2014
(Continued)

OTHER PUBLICATIONS

Sep. 25, 2019—(CA) Office Action—App 3,022,756.
(Continued)

*Primary Examiner* — Henry Y Liu
(74) *Attorney, Agent, or Firm* — Banner & Witcoff, Ltd.

(57) ABSTRACT

A toothed belt includes: a belt main body having a tooth portion and a groove portion alternately disposed at a fixed pitch in a longitudinal direction, and an outer portion disposed on the outer surface thereof; and a cord buried on a predetermined pitch line on the outer portion, in which the belt main body includes: a support layer, disposed under the cord and containing a thermoplastic polyurethane material; and a cured polyurethane elastomer in addition to the support layer, and in which the support layer is formed of a mixture of the thermoplastic polyurethane material and the polyurethane elastomer, which are integrally cured.

5 Claims, 4 Drawing Sheets

(51) Int. Cl.
  *B29C 39/10*    (2006.01)
  *B29C 70/30*    (2006.01)
  *B29K 75/00*    (2006.01)
  *B29K 275/00*   (2006.01)
  *B29L 31/00*    (2006.01)

(52) U.S. Cl.
  CPC ...... *B29K 2075/00* (2013.01); *B29K 2275/00* (2013.01); *B29L 2031/7094* (2013.01)

(58) Field of Classification Search
  USPC .......................................................... 474/205
  See application file for complete search history.

(56) References Cited

U.S. PATENT DOCUMENTS

| | | | | |
|---|---|---|---|---|
| 5,405,299 | A * | 4/1995 | Kubo | F16G 1/28 |
| | | | | 474/205 |
| 5,536,214 | A | 7/1996 | Akita et al. | |
| 5,741,197 | A | 4/1998 | Akita et al. | |
| 5,807,194 | A | 9/1998 | Knutson et al. | |
| 2007/0232429 | A1* | 10/2007 | Knox | F16G 1/28 |
| | | | | 474/205 |
| 2009/0199347 | A1* | 8/2009 | Wood | F16G 1/10 |
| | | | | 8/115.6 |
| 2010/0279808 | A1* | 11/2010 | Fan | F16G 5/20 |
| | | | | 474/205 |
| 2012/0071286 | A1* | 3/2012 | Pasch | B32B 5/024 |
| | | | | 474/205 |
| 2012/0309573 | A1 | 12/2012 | Well et al. | |
| 2013/0040771 | A1* | 2/2013 | Well | F16G 1/28 |
| | | | | 474/205 |
| 2013/0190120 | A1* | 7/2013 | Fan | F16G 5/06 |
| | | | | 474/205 |
| 2014/0243134 | A1 | 8/2014 | Kucharczyk et al. | |
| 2014/0342110 | A1 | 11/2014 | Zhu et al. | |
| 2015/0152590 | A1* | 6/2015 | Knox | F16G 1/10 |
| | | | | 428/36.92 |
| 2015/0285334 | A1* | 10/2015 | Thomas | F16G 1/10 |
| | | | | 474/90 |
| 2016/0053850 | A1* | 2/2016 | Brocke | F16G 5/08 |
| | | | | 474/205 |
| 2016/0069420 | A1* | 3/2016 | Sekiguchi | F16H 7/023 |
| | | | | 474/148 |
| 2018/0194093 | A1* | 7/2018 | Steinert | B65G 15/48 |
| 2018/0245247 | A1* | 8/2018 | Nakai | D03D 1/00 |

FOREIGN PATENT DOCUMENTS

| | | |
|---|---|---|
| CN | 104755521 A | 7/2015 |
| JP | S60-007442 U | 1/1985 |
| JP | S63-222846 A | 9/1988 |
| JP | S63-246532 A | 10/1988 |
| JP | H05-062657 B2 | 9/1993 |
| JP | H07-158700 A | 6/1995 |
| JP | H10-148238 A | 6/1998 |
| JP | 2000-104792 A | 4/2000 |
| JP | 2002-039274 A | 2/2002 |
| JP | 2004347054 A | 12/2004 |
| JP | 2005157198 A | 6/2005 |
| JP | 2010-127442 A | 6/2010 |

OTHER PUBLICATIONS

Feb. 20, 2020—(KR) Office Action—App 10-2018-7034996, Eng Tran.
Jan. 11, 2018—(TW) Office Action—App 106118644.
Aug. 15, 2017—International Search Report—Intl App PCT/JP2017/020876.
Jan. 19, 2020—(CN) Notification of First Office Action—App 201780033221.0, Eng Tran.
Nov. 26, 2019—(EP) Extended EP Search Report—App 17810278.6.

* cited by examiner

Dr.-pulley         Dn.-pulley

FIG. 5

(Belt A) Tooth pitch: 1.0 mm, Belt width: 4.0 mm

| | Comp. Ex. 1 | Comp. Ex. 2 | Comp. Ex. 3 | Ex. 1 | Ex. 2 | Ex. 3 |
|---|---|---|---|---|---|---|
| Structure | With nose | Without nose | Without nose, Nylon canvas is disposed | Polyurethane nonwoven fabric is disposed. Basis weight (25 g/m²) | Polyurethane nonwoven fabric is disposed. Basis weight (50 g/m²) | Polyurethane nonwoven fabric is disposed. Basis weight (200 g/m²) |
| Shape | Cord | Cord | Cord / Nylon canvas | Cord / Nonwoven fabric (disappears on crosslinking) | Cord / Nonwoven fabric (disappears on crosslinking) | Cord / Nonwoven fabric (disappears on crosslinking) |
| Bending fatigue | C | B | A | A | A | A |
| Exposure of cord on tooth bottom surface | Absence | Presence | Absence | Absence | Absence | Absence |
| Delamination between dissimilar materials | Absence | Absence | Presence | Absence | Absence | Absence |
| Degree of freedom of pitch line | B | C | C | A | A | A |

FIG. 6

(Belt B) Tooth pitch: 8.0 mm, Belt width: 15.0 mm

| | Comp. Ex. 4 | Comp. Ex. 5 | Comp. Ex. 6 | Ex. 4 | Ex. 5 | Ex. 6 |
|---|---|---|---|---|---|---|
| Structure | With nose | Without nose | Without nose. Nylon canvas is disposed | Polyurethane nonwoven fabric is disposed. Basis weight (25 g/m$^2$) | Polyurethane nonwoven fabric is disposed. Basis weight (50 g/m$^2$) | Polyurethane nonwoven fabric is disposed. Basis weight (200 g/m$^2$) |
| Shape | Cord | Cord | Cord / Nylon canvas | Cord / Nonwoven fabric (disappears on crosslinking) | Cord / Nonwoven fabric (disappears on crosslinking) | Cord / Nonwoven fabric (disappears on crosslinking) |
| Bending fatigue | C | B | A | A | A | A |
| Exposure of cord on tooth bottom surface | Absence | Presence | Absence | Absence | Absence | Absence |
| Delamination between dissimilar materials | Absence | Absence | Presence | Absence | Absence | Absence |
| Degree of freedom of pitch line | B | C | C | A | A | A |

TOOTHED BELT AND MANUFACTURING METHOD THEREFOR

CROSS REFERENCE TO RELATED APPLICATIONS

This is a U.S. National Phase Application under 35 U.S.C. § 371 of International Application No. PCT/JP2017/020876, filed Jun. 5, 2017, which claims priority to Japanese Application Nos. 2016-112473 filed Jun. 6, 2016 and 2017-107941 filed May 31, 2017, which was published Under PCT Article 21(2), the entire contents of which are incorporated herein by reference.

TECHNICAL FIELD

The present invention relates to a polyurethane-made toothed belt and a manufacturing method thereof, and more particularly relates to a polyurethane-made toothed belt of which a tooth bottom surface of the belt is reinforced and a manufacturing method thereof.

BACKGROUND ART

A toothed belt is used for a synchronous power transmission system that transmits rotation without slip. The polyurethane-made toothed belt which is excellent in appearance and hard to generate wear scraps has been widely used as a power transmission belt for general industrial use, precision equipment, and the like. This polyurethane-made toothed belt has a configuration in which a tooth portion and a groove portion are alternately formed at a fixed pitch in the longitudinal direction of the belt and a cord made of a rope of glass fiber, aramid fiber or the like is buried in an outer portion on a pitch line (PLD).

Figure 3:
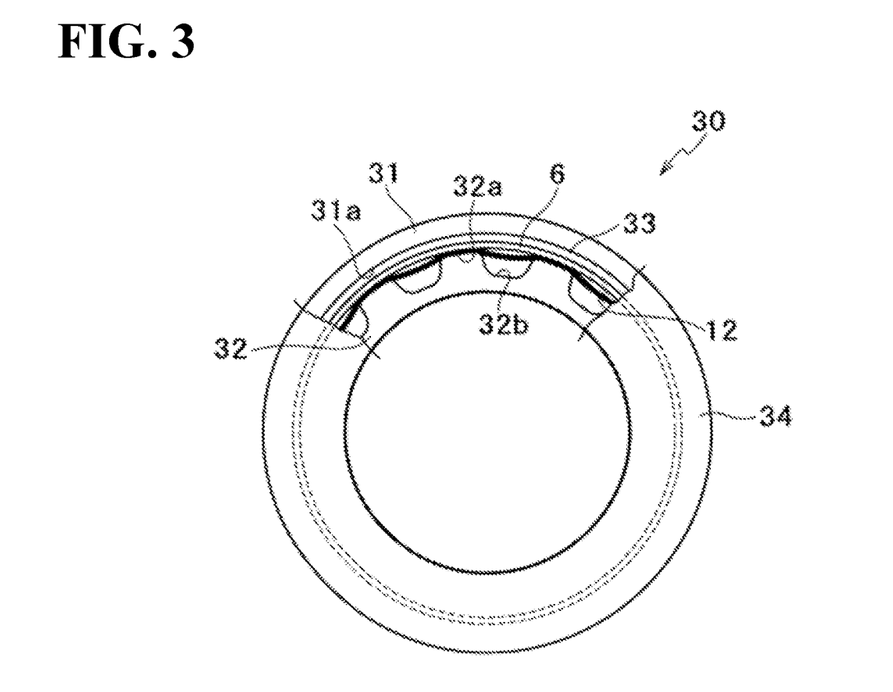
FIG. 3 is a schematic top view illustrating a manufacturing apparatus and a manufacturing method of the toothed belt according to the present invention.

As illustrated in FIG. 3 of this application, such a polyurethane-made toothed belt is manufactured by using a mold including a bottomed cylindrical outer mold 31 and a cylindrical inner mold 32 fitted into the outer mold 31, and having a space portion 33 formed between the outer mold 31 and the inner mold 32, to which a belt material is filled.

As a procedure of belt forming, the cord is spirally wound around an outer peripheral surface 32a of the inner mold 32 in which a plurality of tooth portion-forming portions 32b to form the tooth portions of a belt main body are recessed at a predetermined interval along a circumferential direction. In this state, the belt material is cast in the space portion and then, cured (solidified) to prepare a belt molded body. The belt molded body is cut at a predetermined width, to thereby manufacture a plurality of toothed belts.

In the toothed belt obtained by this method, since the cord is exposed to a tooth bottom portion of the belt, abrasion of the cord is promoted by contact with a pulley tooth, so that a decrease in belt strength is likely to occur. Therefore, a protruding projection is provided at a portion corresponding to the tooth bottom portion of the belt of the inner mold for manufacturing the belt, the cord is wound around the projection, and the belt material is cast and molded. In the toothed belt manufactured by this mold, the projection becomes a recessed portion (called nose, notch, etc.) on the belt. This nose is located in a center portion of a tooth bottom surface of the belt. In the toothed belt having noses (recessed portions) in this manner, although the abrasion of the cord is inhibited when meshing with the pulley, there arises a problem that stress is concentrated on the recessed portion of the tooth bottom surface of the belt due to a belt bending, so that a bending fatigue resistance decreases.

In view of the above problems, toothed belts such as PTLs 1, 2, and 3 have been proposed.

In the toothed belt of PTL 1, although a nose is provided on a groove bottom surface of the belt, the shape of the nose is changed such that the cord is exposed approximately half in this nose and the stress concentration is alleviated.

In the toothed belt of PTL 2, instead of providing a recessed portion (nose) on the tooth bottom surface, a woven fabric (canvas) is disposed so as not to expose the cord from the tooth bottom surface, so that damage to the cord is inhibited even when coming into contact with the pulley.

In the toothed belt of PTL 3, no nose is provided but a compressed nonwoven fabric impregnated with an elastomer material is provided at the tooth bottom surface of the belt.

CITATION LIST

Patent Literature

PTL 1: JP-A 2000-104792
PTL 2: JP-A H10-148238
PTL 3: JP-B H05-62657

SUMMARY OF INVENTION

Technical Problem

However, in the belt of PTL 1, even though the shape of the nose is changed, the nose still remains, and the above problem cannot be sufficiently solved.

In the belt of PTL 2, a woven fabric (canvas) is disposed on the tooth bottom surface so as not to expose the cord from the tooth bottom surface, whereby damage to the cord is inhibited even when coming into contact with the pulley. However, adhesion between the cord and the woven fabric cannot be sufficiently obtained and inter-layer delamination between the cord and the woven fabric is likely to occur as wear of the tooth bottom surface (woven fabric) in contact with the pulley progresses.

The belt of PTL 3 has no nose and has a compressed nonwoven fabric impregnated with the elastomer material, provided at the tooth bottom surface of the belt. The above-described inter-layer delamination is inhibited compared to the case of the woven fabric of PTL 2, but still insufficient.

The present invention is to solve such problems and provides: a power transmission belt made of polyurethane, which has no nose (recessed portion) on the tooth bottom surface of the belt, has a cord buried in the longitudinal direction of the belt, which is completely buried in a belt main body without being exposed to the tooth bottom surface, and does not cause the above-described inter-layer delamination even in power transmission applications under relatively high load conditions by adopting a structure where a dissimilar material difficult to adhere to the cord is not use; and a manufacturing method thereof.

Solution to Problem

In order to solve the above problems, the toothed belt of the present invention is a toothed belt including: a belt main body having a tooth portion and a groove portion alternately disposed at a fixed pitch in a longitudinal direction, and an outer portion disposed on the outer surface thereof; and a cord buried on a predetermined pitch line on the outer portion, in which the belt main body includes: a support layer, disposed under the cord and containing a thermoplastic polyurethane material; and a cured polyurethane elastomer in addition to the support layer, and in which the support layer is formed of a mixture of the thermoplastic polyurethane material and the polyurethane elastomer, which are integrally cured.

According to this configuration, since a thermosetting polyurethane elastomer is interfused to the thermoplastic polyurethane material and these are integrally cured, the support layer maintains the supporting function for the cord before and after curing. That is, since a firm support layer is formed under the cord, the cord is not exposed to the tooth bottom surface. In addition, since these belong to the same polyurethane type, the interfused state after curing is kept strong and there is no fear of inter-layer delamination.

In the toothed belt of the present invention, the thermoplastic polyurethane material of the support layer preferably melts at a temperature at which the polyurethane elastomer cures.

According to this configuration, even if the thermoplastic polyurethane material melts in the process of curing by heating the thermosetting polyurethane elastomer, since both are in a mixed state, it is wrapped in a curing polyurethane elastomer and the supporting function thereof is maintained. In the cooling process after curing, the thermoplastic polyurethane material is also cured, which leads to the formation of a strong support layer, and flexibility and stretchability of the belt main body can be maintained.

In addition, the method for manufacturing a toothed belt of the present invention is a manufacturing method of a polyurethane-made toothed belt including a cord and a belt main body in which the cord is buried, and includes: a first step of disposing a thermoplastic polyurethane nonwoven fabric in a tubular shape on a cylindrical inner mold having a groove portion and winding the cord thereon; a second step of inserting the inner mold into a bottomed cylindrical outer mold and injecting a liquid raw material of a polyurethane into an inside of the mold; a third step of depressurizing the inside of the mold to permeate the raw material of the polyurethane into the thermoplastic polyurethane nonwoven fabric; and a fourth step of heating the inside of the mold to generate a polyurethane elastomer and forming the belt main body, in which in the fourth step, the thermoplastic polyurethane nonwoven fabric melts and is interfused and integrally cured with the raw material of the polyurethane.

According to this configuration, when a polyurethane elastomer forming a base material (belt main body) undergoes a crosslinking reaction (curing), the thermoplastic polyurethane nonwoven fabric is melted by the heat to be integrated with the belt main body and a polyurethane layer is also formed under the cord (tooth bottom surface). That is, at the tooth bottom portion, the polyurethane support layer can be reliably formed under the cord, and a belt in which the cord is completely buried in the polyurethane belt main body can be easily formed.

In the method for manufacturing a toothed belt of the present invention, the thermoplastic polyurethane nonwoven fabric has a basis weight of from 25 to 200 g/m$^2$.

According to this configuration, pitch line on which the cord is disposed can be finished to a predetermined size by varying the basis weight within this range.

In the method for manufacturing a toothed belt of the present invention, the thermoplastic polyurethane nonwoven fabric has a melting point range of from 100 to 130° C., and preferably 100 to 110° C. According to this configuration, the thermoplastic polyurethane nonwoven fabric can be melted appropriately in the curing process of the polyurethane elastomer.

Advantageous Effects of Invention

According to the present invention, there is no nose on the tooth bottom surface of the belt, the cord is not exposed to the tooth bottom surface, and it is unnecessary to coat dissimilar materials such as canvas, which are difficult to adhere to the cord, at the tooth bottom surface. Therefore, a polyurethane-made toothed belt capable of inhibiting occurrence of inter-layer delamination can be provided.

DESCRIPTION OF EMBODIMENTS

Next, embodiments of the present invention will be described with reference to the drawings. The present embodiment exemplifies a polyurethane-made toothed belt, which is used for a synchronous power transmission system that transmits rotation without slip.

In this toothed belt, for convenience, an outer portion side of the belt is defined as an upper side and a tooth portion side is defined as a lower side.

(Configuration of Toothed Belt 1)

Figure 1:
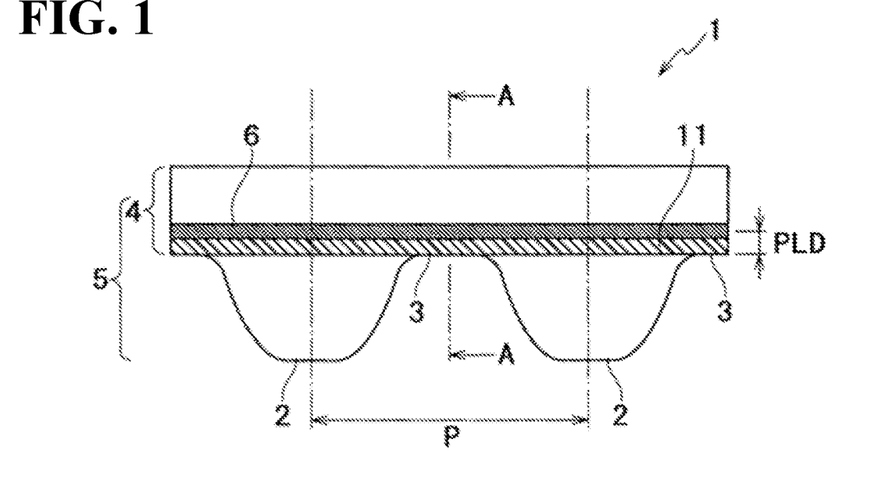
FIG. 1 is a side view of a toothed belt of the present invention.
Figure 2:
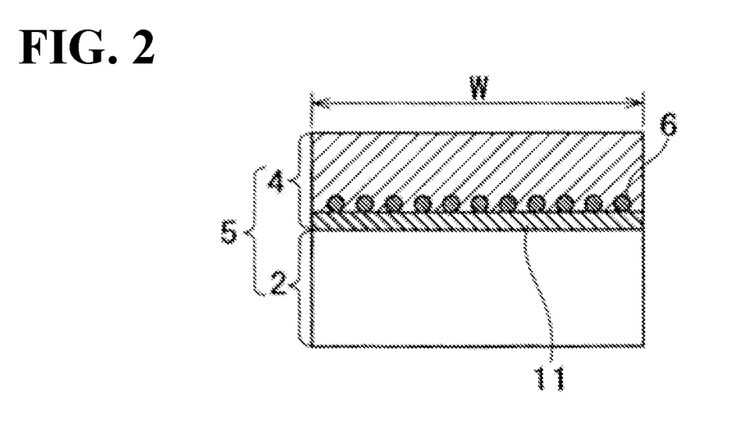
FIG. 2 is a cross-sectional view taken along line A-A of FIG. 1.

As illustrated in FIG. 1 and FIG. 2, the toothed belt 1 of the present embodiment includes: a polyurethane-made belt main body 5 having a tooth portion 2 and a groove portion 3 alternately disposed at a fixed pitch P in a longitudinal direction, and an outer portion 4 disposed on an outer surface thereof; and a cord 6 buried on a predetermined pitch line PLD of the outer portion 4.

The groove portion 3 is formed as a space defined by both side surfaces of the opposing tooth portions 2 and a tooth bottom surface (bottom surface of groove portion 3) which is a lower surface of the outer portion 4.

The belt main body 5 includes: a support layer 11 disposed under the cord 6 and including a thermoplastic polyurethane material; and a cured polyurethane elastomer in addition to the support layer 11. The support layer 11 is formed by interfusing the polyurethane elastomer into the thermoplastic polyurethane material and curing these integrally.

(Constituent Material of Belt Main Body 5 Other Than Support Layer 11)

The belt main body 5 other than the support layer 11 includes a thermosetting polyurethane elastomer (polyurethane elastic body). It may be formed only of the thermosetting polyurethane elastomer or may contain other components such as additives well known in the related art as appropriate, as long as the effect of the present invention is not impaired.

This polyurethane elastomer can be obtained from, for example, a material (raw material) prepared by blending an isocyanate group-terminated urethane prepolymer with a curing agent, a plasticizer or the like.

The type of the curing agent may be appropriately selected according to the type of the urethane prepolymer, and examples thereof include polyol compounds such as ethylene glycol, 1,3-propanediol and 1,4-butanediol, amine compounds of primary amines, secondary amines and tertiary amines, and the like.

In addition, examples of the plasticizer to be used include phthalic acid diesters such as di-2-ethylhexyl phthalate, dioctyl phthalate, dibutyl phthalate, diethyl phthalate, and diisodecyl phthalate, adipic acid diesters such as dioctyl adipate and diisodecyl adipate, dibasic acid esters such as aliphatic dibasic acid esters other than the adipic acid diesters, phosphate esters, aromatic carboxylate esters, epoxy plasticizers, and polyester plasticizers.

These curing agents and plasticizers each can be used alone or in combination of two or more kinds thereof.

The isocyanate group-terminated urethane prepolymer can be obtained by performing a reaction so that the isocyanate group of a polyisocyanate compound is excessive in molar ratio with respect to the hydroxyl group of a polyol.

The polyisocyanate compound is a compound having two or more isocyanate groups in the molecule (low molecule or molecular chain of urethane prepolymer), and for example, aromatic isocyanates, aliphatic polyisocyanates, alicyclic polyisocyanates, carbodiimide-modified polyisocyanates of each of the above polyisocyanates, isocyanurate-modified polyisocyanates of each of the above polyisocyanates, and the like can be used alone or in combination of two or more kinds thereof.

The polyol is a compound having two or more hydroxyl groups in the molecular chain, typical examples thereof include polyether polyol, polyester polyol, polymer polyol, and the like, and polyether polyol is particularly preferable. The polyether-based thermosetting polyurethane formed from the polyether polyol is excellent in hydrolysis resistance as compared with the polyester-based polyurethane formed from the polyester polyols, so that it has less deterioration over time even after long-term use and is excellent in durability.

The isocyanate group-terminated urethane prepolymer of the present embodiment is not particularly limited as long as it has at least two or more isocyanate groups in the molecular chain of the urethane prepolymer.

The position of the isocyanate group in the molecular chain of the urethane prepolymer is also not particularly limited, and may be at the terminal of the main chain of the urethane prepolymer molecular chain or may be at the terminal of the side chain.

(Constituent Material of Support Layer 11)

The support layer 11 is formed by interfusing the polyurethane elastomer into a thermoplastic polyurethane material and curing these integrally.

The thermoplastic polyurethane used for the thermoplastic polyurethane material includes polyether-based thermoplastic polyurethanes, polyester-based thermoplastic polyurethanes, polycarbonate-based thermoplastic polyurethanes, and the like. In particular, polyether-based thermoplastic polyurethanes are preferable, which are excellent in mechanical strength, abrasion resistance and bending resistance as properties after melting, cooling and solidification.

Whereas the thermoplastic polyurethane material is thermoplastic, the polyurethane elastomer is thermosetting. That is, both are interfused so that the thermoplastic polyurethane material is wrapped with the thermosetting polyurethane elastomer.

A thermoplastic polyurethane nonwoven fabric made of polyurethane fibers as a material is used as a raw material of the thermoplastic polyurethane material in order to secure the interfused state of both.

The thermoplastic polyurethane nonwoven fabric preferably has a structure in which fine continuous filaments of the polyurethane elastic fibers are randomly laminated.

The thermoplastic polyurethane nonwoven fabric having such a structure has properties such as easy melting, fast curing, rich in flexibility and sustaining stretchability after melting.

When a liquid raw material of the polyurethane elastomer is impregnated into the polyurethane nonwoven fabric, an interfused state of both can be obtained. During the curing process of the liquid raw material of the polyurethane elastomer, the polyurethane nonwoven fabric melts but the surrounding polyurethane elastomer raw material is cured and the form of the support layer 11 is maintained. In the cooling process after curing, the molten thermoplastic polyurethane material is also cured to obtain a cured state where both are integrated.

(Constituent Material of Cord 6)

Low-elongation and high-strength cord made of steel fibers, aramid fibers, polyester fibers, glass fibers, or the like can be used. The glass fibers generally having properties such as high strength and heat resistance are preferred. The diameter of the cord used is in the range of from 0.2 to 1.0 mm.

(Regarding Toothed Belt 1)

The function of the toothed belt 1 formed of such constituent materials will be described below.

The thermoplastic polyurethane material contained in the support layer 11 is made from the thermoplastic polyurethane nonwoven fabric as a raw material. This thermoplastic polyurethane nonwoven fabric is made of polyurethane elastic fibers as a material. Between the polyurethane elastic fibers randomly overlapping is allowed to permeate the liquid raw material of the polyurethane into fine portion, whereby the interfused state of both can be realized. When the polyurethane raw material is thermally cured, the polyurethane elastic fibers melt and the interfused state of both becomes reliable. On the other hand, since the polyurethane raw material is cured, the form of the support layer 11 is not impaired. In the cooling process after curing, the melted polyurethane fibers, although the fibrous form is not maintained, are cooled and cured to form the support layer 11 that maintains flexibility and stretchability. Therefore, as illustrated in FIG. 1, the cord 6 is supported by the above-described support layer 11 and has no nose at the tooth bottom portion of the groove portion 3.

The thermoplastic polyurethane material after cooling and solidification and the polyurethane elastomer after thermosetting, which constitute the support layer 11, are materials belonging to the same type. Therefore, it is likely to be integrated with the polyurethane elastomer of the belt main body 5. In addition, there is also little fear of inter-layer delamination.

According to the above-described configuration, the support layer 11 is formed by interfusing a thermosetting polyurethane elastomer with a thermoplastic polyurethane material and curing these integrally. Therefore, the supporting function for the cord 6 is maintained before and after curing. That is, since the firm support layer 11 is formed under the cord 6, the cord is not exposed to the tooth bottom surface. In addition, since these belong to the same polyurethane type, the interfused state after curing is kept strong and there is little fear of inter-layer delamination. The polyurethane material forming the support layer 11 also adheres to the inside and the surface of the cord and can be bonded to the cord by curing. That is, the cord is strongly adhered by the adhesive function of the polyurethane itself.

Such a support layer 11 can be reliably obtained by using a thermoplastic polyurethane material of the support layer 11, which melts at a temperature at which the polyurethane elastomer cures. As a result, the thermoplastic polyurethane material timely melts. In addition, the thermoplastic polyurethane material after cooling and solidification has appropriate properties.

(Configuration of Mold 30 Used for Manufacturing)

As illustrated in FIG. 3 of this application, such a polyurethane-made toothed belt 1 can be manufactured by using a mold 30 including a bottomed cylindrical outer mold 31 and a cylindrical inner mold 32 fitted into the outer mold 31, and having a space portion 33 formed between the outer mold 31 and the inner mold 32, to which a belt material is filled.

On the outer periphery of the inner mold 32, a tooth portion-forming portion 32b corresponding to the tooth portion 2 of the toothed belt 1 and an outer peripheral surface 32a corresponding to the tooth bottom surface of the groove portion 3 of the toothed belt 1 are alternately arranged.

On the inner periphery of the outer mold 31, an inner peripheral surface 31a corresponding to the upper surface of the outer portion 4 of the toothed belt 1 is formed.

As illustrated in the drawing, when the inner mold 32 is inserted into the outer mold 31, the space portion 33 corresponding to the toothed belt 1 is formed. In order to heat the belt material in the space portion 33, the mold 30 is provided with heating means capable of heating to a mold temperature of from 80 to 150° C.

A lid body 34 is attached to the mold 30, and the space portion 33 can be a sealed space.

In addition, an injection port for injecting a liquid belt material into the space portion 33, a suction port for depressurizing the space portion 33, and a pressurizing port for pressurizing the space portion 33 are provided at appropriate places of the mold 30. The suction port and the pressurizing port may be of a dual purpose type.

(Manufacturing Method)

Hereinafter, a method for manufacturing s polyurethane toothed belt of the present invention will be described.

FIG. 3 is a schematic top view illustrating the method for manufacturing the polyurethane toothed belt.

Winding Step:

First, a tubular thermoplastic polyurethane nonwoven fabric 12 having end portions thermally fused with each other is disposed on the outer peripheral surface of the inner mold 32. It is preferable that the tubular thermoplastic polyurethane nonwoven fabric 12 in which its end portions are thermally fused in advance is inserted into the inner mold 32. The end portions may be thermally fused after the thermoplastic polyurethane nonwoven fabric 12 is wound into a tubular shape in the inner mold 32.

Next, the cord 6 is spirally wound from above the tubular thermoplastic polyurethane nonwoven fabric 12.

Although the thermoplastic polyurethane nonwoven fabric 12 around which the cord 6 is wound bends to a certain extent, a layer that forms a support layer having a predetermined thickness is formed at least on the outer peripheral surface 32a of the inner mold 32.

Injection Step:

The inner mold 32 is inserted into the outer mold 31, and the raw material (liquid state) of the polyurethane to form the belt main body 5 is cast via an injection port, which is not illustrated. The liquid raw material of polyurethane may be poured into the space portion 33 while the lid body 34 is removed.

Permeation Step:

An interior of the mold 30 is sealed by the lid body 34. Next, the air bubbles in the liquid raw material are removed by depressurizing via a suction port, which is not illustrated. At the same time, the liquid raw material is allowed to permeate also into the thermoplastic polyurethane nonwoven fabric 12 due to flowing. That is, the liquid raw material of the polyurethane is permeated into the fine portion between randomly-overlapping polyurethane elastic fibers constituting the nonwoven fabric.

Heating Step:

After completion of the filling of the liquid raw material to form the belt main body 5, air is introduced into the mold 30 to pressurize, and the crosslinking (curing) reaction is performed at a predetermined temperature to generate the polyurethane elastomer. The mold temperature at this time is from 80 to 150° C.

In the process of the urethane-crosslinking reaction (curing reaction), the thermoplastic polyurethane nonwoven fabric 12 is melted and mixed with the polyurethane forming the belt main body 5, and cured integrally. The fibrous form as a nonwoven fabric disappears.

In the process of the urethane-crosslinking reaction, although a heating step is necessary, there is a case where a pressurizing step of pressurizing by introducing air is not necessary.

Post Processing Step:

After curing, the belt is taken out from the inner mold 32, allowed to cool naturally, and thereafter cut into an annular shape with a predetermined width, to thereby obtain a polyurethane-made toothed belt 1.

Manufacturing Condition 1:

As the nonwoven fabric used here, the thermoplastic polyurethane nonwoven fabric made of polyurethane fibers as a material is used. The pitch line PLD can be easily controlled by varying the basis weight of the nonwoven fabric to be used and/or the number of laminated layers as necessary.

A desired pitch line PLD can be obtained by selecting the basis weight of the thermoplastic polyurethane nonwoven fabric within a range of from 25 to 200 g/m$^2$.

Manufacturing Condition 2:

The melting point range of the thermoplastic polyurethane nonwoven fabric is from 100 to 130° C., and preferably from 100 to 110° C.

With the melting point within this range, the nonwoven fabric is properly melted during the curing process of the polyurethane elastomer, the interfused state of both becomes reliable, and the supporting function is not impaired.

Characteristics of the thermoplastic polyurethane nonwoven fabric includes properties such as easy melting, fast curing, rich in flexibility and sustaining stretchability after melting.

Hereinbefore, although the embodiments of the present invention have been described with reference to the drawings, it should be understood that specific configuration is not limited to these embodiments and Examples. The scope of the present invention is indicated not only by the embodiments described above and the descriptions of Examples described below but also by claims, and further includes meaning equivalent to the claims and all changes within the scope of the claims.

EXAMPLE

In order to confirm the effect of the present invention, for two types of toothed belts with different belt sizes (tooth pitch variations), the toothed belts of Examples (Examples 1 to 6) and Comparative Examples (Comparative Examples 1 to 6) were each subjected to a durability running test to examine bending fatigue and the like.

As Examples, polyurethane toothed belts were produced with the following sizes (belts A, B) and constituent materials according to the above-described manufacturing method. Six types were prepared, including Examples 1 and 4 having a basis weight of the nonwoven fabric of 25 g/m$^2$, Examples 2 and 5 of 50 g/m$^2$, and Examples 3 and 6 of 200 g/m$^2$.

(Belt Size)

Belt A: The belt width is 4.0 mm, the tooth pitch is 1.0 mm, and the number of teeth is 746.

Belt B: The belt width is 15.0 mm, the tooth pitch is 8.0 mm, and the number of teeth is 150.

(Constituent Materials)

The belt main body is a polyether-based polyurethane elastomer.

As for the cord, a glass fiber (E glass) is used for belt A, which cord diameter is 0.24 mm, and an aramid fiber is used for belt B, which cord diameter is 1.0 mm.

As the nonwoven fabric, a thermoplastic polyurethane nonwoven fabric "Espansione FF (registered trademark)" (manufactured by KB Seiren, LTD) is used. One having a basis weight of 25 g/m$^2$ was used in Examples 1 and 4, one of 50 g/m$^2$ was used in Examples 2 and 5, and one of 200 g/m$^2$ was used in Examples 3 and 6.

In addition, as Comparative Examples, the following polyurethane toothed belts were prepared. The belt sizes and the constituent materials of the belt main body and cord are the same as those in Examples.

Toothed belts with nose on tooth bottom surfaces of the belts (Comparative Examples 1 and 4)

Toothed belts with no nose on the belts and cords exposed from the tooth bottom surfaces (Comparative Examples 2 and 5)

Toothed belts with no nose on the belts and covered with nylon canvas on the tooth bottom surfaces (Comparative Examples 3 and 6)

(Test Method)

Figure 4:
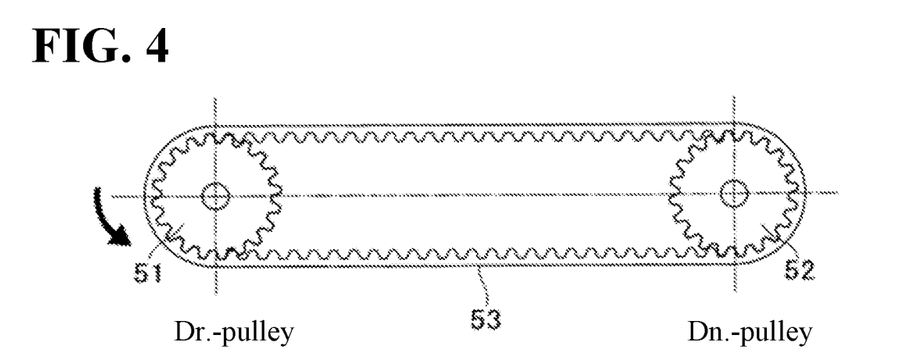
FIG. 4 is a schematic side view illustrating a running test example of the toothed belt.

For each of the produced belts, a durability running test illustrated in FIG. 4 and Table 1 was performed. In FIG. 4, a two-axis layout device is used in which a belt 53 is wound between Dr.-pulley 51 and Dn.-pulley 52. The running conditions of this device are shown in Table 1.

TABLE 1

| Running conditions for Belt A | | Running conditions for Belt B | |
|---|---|---|---|
| Dr. | 20 teeth | Dr. | 24 teeth |
| Dn. | 20 teeth | Dn. | 24 teeth |
| Rotation speed | 3,000 rpm | Rotation speed | 1,800 rpm |
| Axial load | 20N | Axial load | 500N |
| Load | No load | Load | No load |
| Running time | 200 h | Running time | 200 h |

Figure 5:
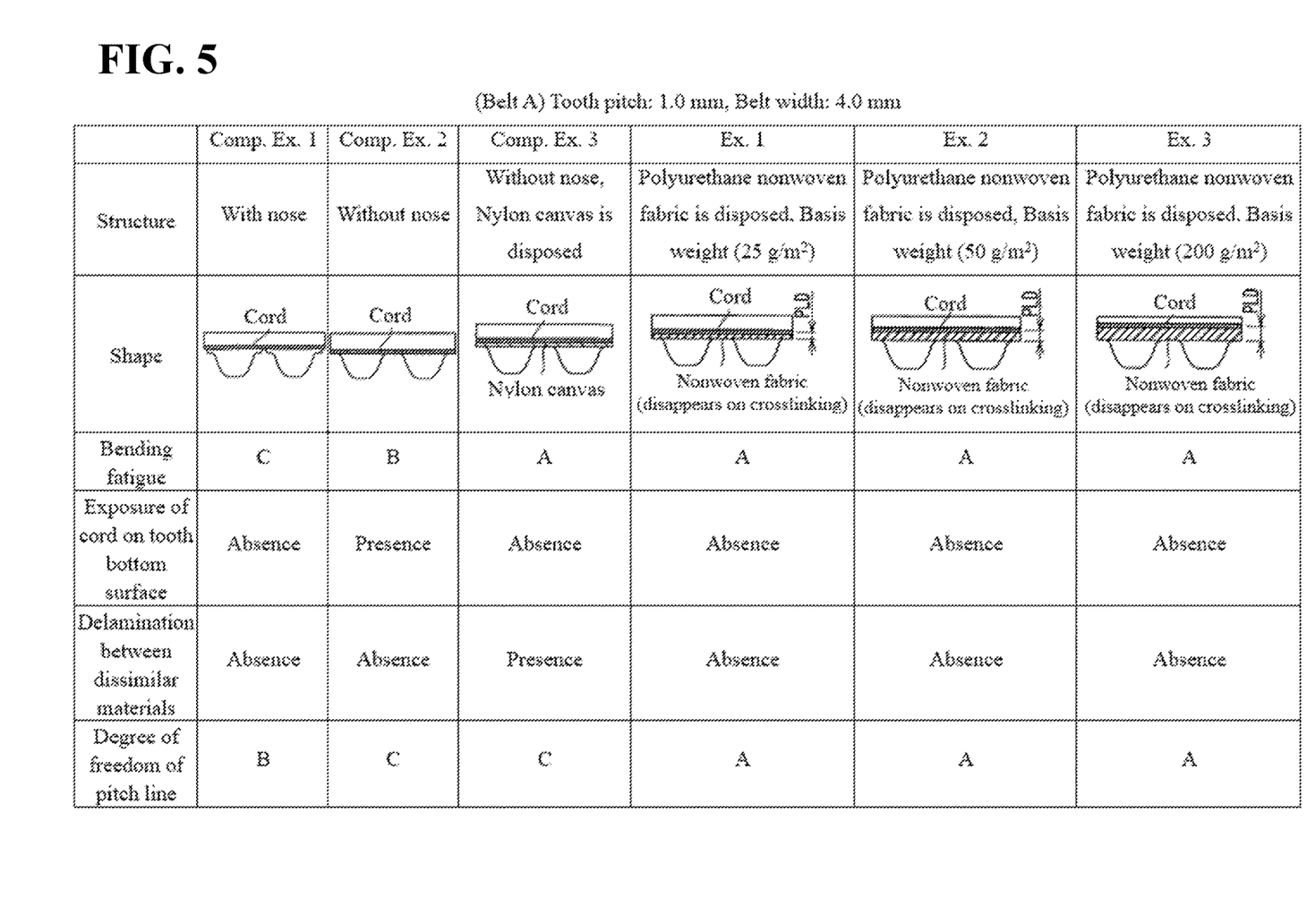
FIGS. 5 and 6 summarize results that were observed from three viewpoints according to the running conditions of the toothed belt device of FIG. 4.
Figure 6:
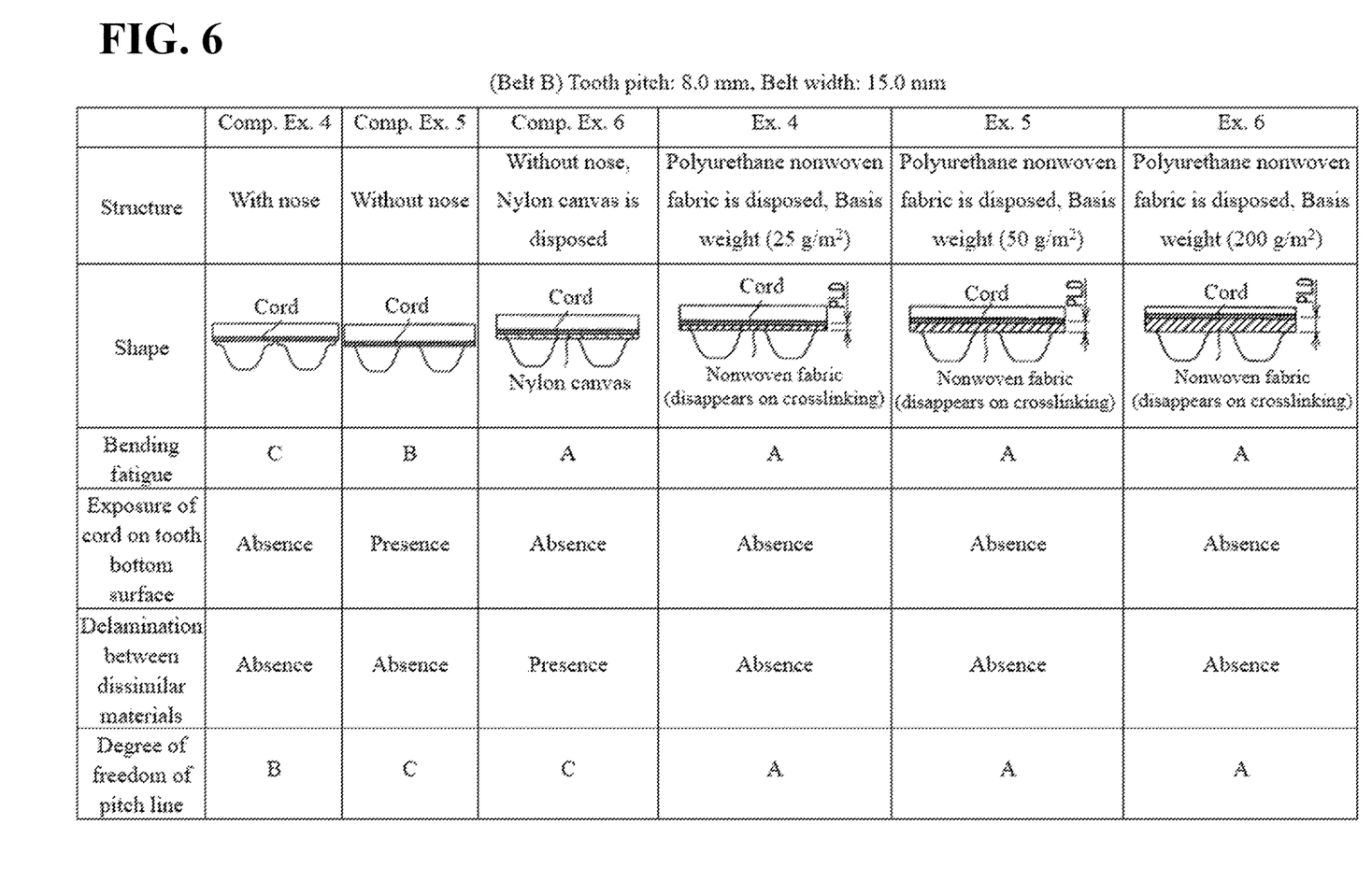

Three viewpoints of "bending fatigue", "presence or absence of exposure of cord on tooth bottom surface" and "presence or absence of delamination between dissimilar materials" were observed and the results are summarized in FIGS. 5 and 6.

(Bending Fatigue)

The belts of Comparative Examples 1 and 4 in FIGS. 5 and 6, respectively, were evaluated as "C" because cracks (cleavages) occurred due to concentration of stress on the nose portion of the tooth bottom surface of the belt when meshing with the pulley.

With regard to Comparative Examples 2 and 5 in FIGS. 5 and 6, respectively, there was no nose, but since the cord was exposed to the tooth bottom surface, the bending fatigue was inhibited but it was evaluated as "B" due to wear of the cord. That is, the belt strength decreases.

In addition, in Comparative Examples 3 and 6 in FIGS. 5 and 6, respectively, the tooth bottom surface of the belt was covered with canvas. In Examples 1 to 6, the tooth bottom surface of the belt was covered with a polyurethane support layer formed. Therefore, there was no influence on bending fatigue and they were evaluated as "A".

(Exposure of Cord on Tooth Bottom Surface)

Only in Comparative Examples 2 and 5, exposure of the cord was remarkable on the tooth bottom surface. The exposure of the cord could not be observed for the others by the arrangement of nose, canvas, or support layer.

(Delamination in Dissimilar Materials)

Since only Comparative Examples 3 and 6 have a material configuration in which the cord and the canvas were in contact with each other, inter-layer delamination occurred between the dissimilar materials. With regard to the others, the occurrence of inter-layer delamination did not occur due to the configuration of only the cord and polyurethane.

(Degree of Freedom of Pitch Line)

Although not the result of the durability running test, the degree of freedom when determining the belt specification was also examined.

In Examples 1 to 6 of FIGS. 5 and 6, the pitch line PLD of the belt could be controlled by varying the basis weight of the polyurethane nonwoven fabric to be used and the number of laminated layers as necessary, so that they were evaluated as "A".

With regard to Comparative Examples 1 and 4, although the thickness of the recessed portion of the nose can be changed, the degree of freedom was small and they were evaluated as "B".

With regard to Comparative Examples 2, 3, 5, and 6, the pitch line PLD was constant and they were evaluated as "C".

From the results in FIGS. 5 and 6, it was found that for each of the sizes of the belt A and the belt B, by forming the support layer using the thermoplastic polyurethane nonwoven fabric, the cord was not exposed to the tooth bottom surface without providing nose on the tooth bottom surface of the belt, and it was not necessary to cover the tooth bottom surface with dissimilar materials such as canvas, which was difficult to adhere to the cord, so that the occurrence of inter-layer delamination could also be inhibited.

In the toothed belt, "tooth pitch" is defined by a standard or the like as an index (nominal) indicating the scale of the belt. That is, the larger the tooth pitch, the larger the tooth profile and the thicker the thickness of the outer portion.

The belt A in FIG. 5 has the tooth pitch of 1 mm, and the belt B in FIG. 6 has the tooth pitch of 8.0 mm. The belt B in FIG. 6 has a larger tooth profile and has a thicker thickness of the outer portion, than those of the belt A in FIG. 5.

Even though there is a difference in scale, it is found that good results were obtained in any of those with a basis weight of 25 g/m², those of 50 g/m², and those of 200 g/m² of the thermoplastic polyurethane nonwoven fabric.

This indicates that since it is applicable in a wide range of basis weight of the polyurethane nonwoven fabric irrespective of the size of the belt, the freedom in setting the pitch line of the belt is high in a wide range of the belt size.

This application is based on Japanese Patent Application No. 2016-112473 dated Jun. 6, 2016 and Japanese Patent Application No. 2017-107941 dated May 31, 2017, the contents of which are incorporated herein by reference.

REFERENCE SIGNS LIST

1 Toothed belt
2 Tooth portion
3 Groove portion
4 Outer portion
5 Belt main body
6 Cord
11 Support layer
12 Nonwoven fabric

The invention claimed is:

1. A toothed belt comprising:
a belt main body having a tooth portion and a groove portion alternately disposed at a fixed pitch in a longitudinal direction, and an outer portion disposed on an outer surface thereof; and
a cord buried on a predetermined pitch line on the outer portion,
wherein the belt main body comprises:
a support layer, disposed under the cord and containing a thermoplastic polyurethane material; and
a cured polyurethane elastomer in addition to the support layer, and
wherein the support layer is formed of a mixture of the thermoplastic polyurethane material and the polyurethane elastomer, which are integrally cured.

2. The toothed belt according to claim 1,
wherein the thermoplastic polyurethane material of the support layer melts at a temperature at which the polyurethane elastomer cures.

3. A method for manufacturing a toothed belt comprising a cord and a belt main body in which the cord is buried, the method comprising:
a first step of disposing a thermoplastic polyurethane nonwoven fabric in a tubular shape on a cylindrical inner mold of a mold having a groove portion and winding the cord thereon;
a second step of inserting the inner mold into a bottomed cylindrical outer mold of the mold and injecting a liquid raw material of a polyurethane into an inside of the mold;
a third step of depressurizing the inside of the mold to permeate the raw material of the polyurethane into the thermoplastic polyurethane nonwoven fabric; and
a fourth step of heating the inside of the mold to generate a polyurethane elastomer and forming the belt main body,
wherein in the fourth step, the thermoplastic polyurethane nonwoven fabric melts, and is interfused and integrally cured with the raw material of the polyurethane.

4. The method for manufacturing a toothed belt according to claim 3,
wherein the thermoplastic polyurethane nonwoven fabric has a basis weight of from 25 to 200 g/m².

5. The method for manufacturing a toothed belt according to claim 3,
wherein the thermoplastic polyurethane nonwoven fabric has a melting point range of from 100 to 130° C.

* * * * *